United States Patent [19]
Nishimura et al.

[11] Patent Number: 6,079,802
[45] Date of Patent: Jun. 27, 2000

[54] RUBBER CRAWLER

[75] Inventors: Naoki Nishimura; Eiji Tsuru, both of Yokohama, Japan

[73] Assignee: Bridgestone Corporation, Tokyo, Japan

[21] Appl. No.: 09/118,068

[22] Filed: Jul. 17, 1998

[30] Foreign Application Priority Data

Jul. 23, 1997 [JP] Japan ................................. 9-214082
Dec. 9, 1997 [JP] Japan ................................. 9-361908

[51] Int. Cl.[7] ................................................ B62D 55/205
[52] U.S. Cl. ........................ 305/157; 305/170; 305/178; 305/169
[58] Field of Search ..................................... 305/165, 167, 305/170, 171, 177, 178, 169, 194, 157

[56] References Cited

U.S. PATENT DOCUMENTS

| | | | |
|---|---|---|---|
| 2,476,459 | 7/1949 | Slemmons | 305/112 |
| 3,575,474 | 4/1971 | Russ, Sr. | 305/165 |
| 3,582,154 | 6/1971 | Russ, Sr. | |
| 3,747,994 | 7/1973 | Russ, Sr. | |
| 3,747,995 | 7/1973 | Russ, Sr. | 305/179 |
| 3,756,668 | 9/1973 | Russ, Sr. | 305/179 |
| 3,779,617 | 12/1973 | Palmaer | 305/178 |
| 3,858,948 | 1/1975 | Johnson et al. | 305/178 |
| 5,005,922 | 4/1991 | Edwards et al. | 305/184 |
| 5,145,242 | 9/1992 | Togashi | 305/171 |
| 5,427,443 | 6/1995 | Muramatsu et al. | 305/166 |
| 5,447,365 | 9/1995 | Muramatsu et al. | |
| 5,540,489 | 7/1996 | Muramatsu et al. | 305/167 |
| 5,593,218 | 1/1997 | Katoh et al. | 305/177 |
| 5,676,436 | 10/1997 | Hart | 305/165 |
| 5,707,123 | 1/1998 | Grob | 305/169 |
| 5,984,438 | 11/1999 | Tsunoda et al. | 305/169 |

FOREIGN PATENT DOCUMENTS

0 578 504 A2  1/1994  European Pat. Off. .

*Primary Examiner*—S. Joseph Morano
*Assistant Examiner*—Long Bao Nguyen
*Attorney, Agent, or Firm*—Oliff & Berridge, PLC

[57] ABSTRACT

In a rubber crawler, lags are generally are formed on the outer surface of an endless belt-like elastomer, and rubber projections for transmission of driving force and prevention of the rubber crawler from coming of off from a wheel are formed on the inner surface of the elastomer at regular pitches. Rein forcing cord layers are embedded in the elastomer along its longitudinal direction. An abrasion resistant member is embedded in the rubber projection along the width direction of the rubber crawler. Its both end portions are exposed at the sides of the rubber projection. The abrasion-resistant member has a central portion having a small diameter and a pair of end portions connected to the ends of the central portion and having a large diameter. In the exposed portion of the end portion which is exposed at the side surface of the rubber projection, its most interior portion in the radial direction is positioned above the base portion of the rubber projection. The rubber crawler of the invention includes thicker portions formed to extend from the width end of the elastomer over the end of the reinforcing cord layer.

14 Claims, 11 Drawing Sheets

RUBBER CRAWLER

BACKGROUND OF THE INVENTION

1. Field of the Invention

The present invention relates to a rubber crawler used in a running section of a vehicle, and in particular to an improved driving rubber projections which project from the inner surface of the crawler.

2. Description of the Related Arts

As a rubber crawler used in a running section of a vehicle, an inner surface-driving type of rubber crawler is known. This is made in such a manner that the inner surface of a rubber crawler will have rubber projections at regular pitches (or intervals) along its longitudinal direction. The rubber projections are engaged with sprockets to transmit driving force or prevent the crawler from coming off from a wheel.

The rubber projections hardly cause any problem when they are properly engaged with the wheel in running. However, when the rubber crawler receives force from its lateral direction or twisting force so that the relative gap between the rubber projections and the sprockets, the wheel and the like is caused, contact and collisions of the rubber projections with the sprockets, the wheel and the like are repeated. This phenomenon is caused so that the gap be canceled and the rubber crawler be restored into the original proper state. During this phenomenon, abrasion and breakage are easily caused in the rubber projection, in particular their both side surfaces.

Thus, proposed is a technique wherein a resin having resistance to abrasion is embedded in the rubber projection in such a manner that the resin will be exposed at both side surfaces of the rubber projection. However, there remains a problem that such abrasion-resistant member is liable to project out or fall away from the rubber projection.

Shearing stress generated in particular when the rubber crawler is rotated is directly transmitted to the body of the rubber crawler through the exposed surface of the abrasion-resistant member, thereby resulting in a problem that cracks are easily caused at the base portion of the rubber projection.

A reinforcing cord such as a steel cord or a bias cord is generally embedded in the rubber elastomer of the rubber crawler along its longitudinal direction. In the case wherein the wheel is rotated while it presses against the inner surface of the rubber crawler when the wheel is driven at a high speed, the rubber portions between lags fall in a crushed state. If this is repeated, the portion in which the reinforcing cord is not embedded (no-cord embedded portion) is bent, especially at the boundary between this portion and the portion in which the reinforcing cord is embedded. As a result, there is caused a problem that cracks are generated at the bent portion, resulting in breakage of the no-cord embedded portion.

SUMMARY OF THE INVENTION

The present invention relates to an improved rubber crawler for overcoming the aforementioned problems. Therefore, an object of the invention is to protect rubber projections projecting out from the inner surface of a rubber crawler from abrasion and breakage, and improve the life span of the rubber crawler.

The first aspect of the present invention is a rubber crawler wherein rubber lugs are formed on the outer surface of an endless belt-like elastomer, rubber projections for transmission of driving force or prevention of the crawler from coming off from a wheel are formed on the inner surface of the elastomer at regular pitches, and abrasion-resistant members are embedded in the respective rubber projections along the width direction of the crawler; and wherein each of the abrasion-resistant members comprises a central portion and a pair of end portions which are connected to both ends of the central portion, and the central portion and the end portions have shapes different from each other in diameters.

In a preferred embodiment of the invention, the central portion of each of the abrasion-resistant members has a shape having a small diameter and each of the end portions thereof has a shape having a larger diameter than that of the central portion.

According to the second aspect of the present invention, each of the end portions of the abrasion-resistant members has an exposed portion which is exposed at the side surface of each of the rubber projections, and the most interior portion in the radial direction of the exposed portion is positioned above a base portion of each of the rubber projections.

In a preferred embodiment of the invention, a sideways curved surface is positioned between the most interior portion in the radial direction of the exposed portion and the base portion of each of the rubber projections, and continues to the inner surface of the rubber crawler.

The third aspect of the present invention is a rubber crawler, wherein a reinforcing cord layer is embedded in an endless belt-like rubber elastomer along its longitudinal direction, and rubber lugs are formed on the outer surface of the elastomer comprises, at each of width direction-end portions of the endless belt-like elastomer, a thicker portion formed so as to extend from the with direction end portion of the endless belt-like elastomer, over width direction-end of the reinforcing cord layer.

DESCRIPTION OF THE PREFERRED EMBODIMENT

In the rubber crawler according to the invention, preferably an abrasion-resistant member having a special shape is embedded in a rubber projection provided for prevention of the crawler from getting out of place and transmission of driving force, and the end portion of the member is exposed at the side surface of the rubber projection. As the abrasion-resistant member having a special shape is used, even if contact of the rubber projection with the sprocket and the wheel is repeated, the abrasion-resistant member is prevented from projecting out and falling away, surely reducing the abrasion and breakage of the rubber projection. Thus, endurance of the rubber projection is more improved.

In the invention, this abrasion-resistant member has, for example, a central portion in a form of a rod having a small diameter, and end portions in forms of columns having a large diameter.

In the preferred embodiment, the exposure position of the abrasion-resistant member in the rubber crawler is above than the inner surface of the rubber crawler; therefore, shearing stress which is generated in particular when the rubber crawler is rotated and which is applied to the exposed surface of the abrasion-resistant member is not transmitted to the rubber crawler directly but is absorbed at the base portion of the rubber projection, thereby preventing generation of cracks in the rubber at this portion.

In the invention, a sideways curved surface having a radius of 1 mm or more, preferably 2 mm or more is positioned between the most interior end portion of the exposed portion of the abrasion-resistant member and the base portion of the rubber projection, and continues to the inner surface of the rubber crawler. The meaning that the exposure position of the abrasion-resistant member is above the inner surface of the rubber crawler includes the case wherein a groove is formed at the inner surface of the rubber crawler, and the exposure position is above the bottom of the groove.

In the rubber crawler according to the invention, each no-cord embedded portion which extends from the end of a steel cord or a bias cord embedded in the rubber elastomer to the end of the rubber elastomer is made thicker than other portions of the elastomer by providing a thicker portion; therefore, rigidity of the no-cord embedded portion is raised so as to prevent breakage of this portion.

A first embodiment of the rubber crawler according to the invention will be in detail described below with reference to FIGS. 1–6, 8, 9 and 13–16.

Figure 1:
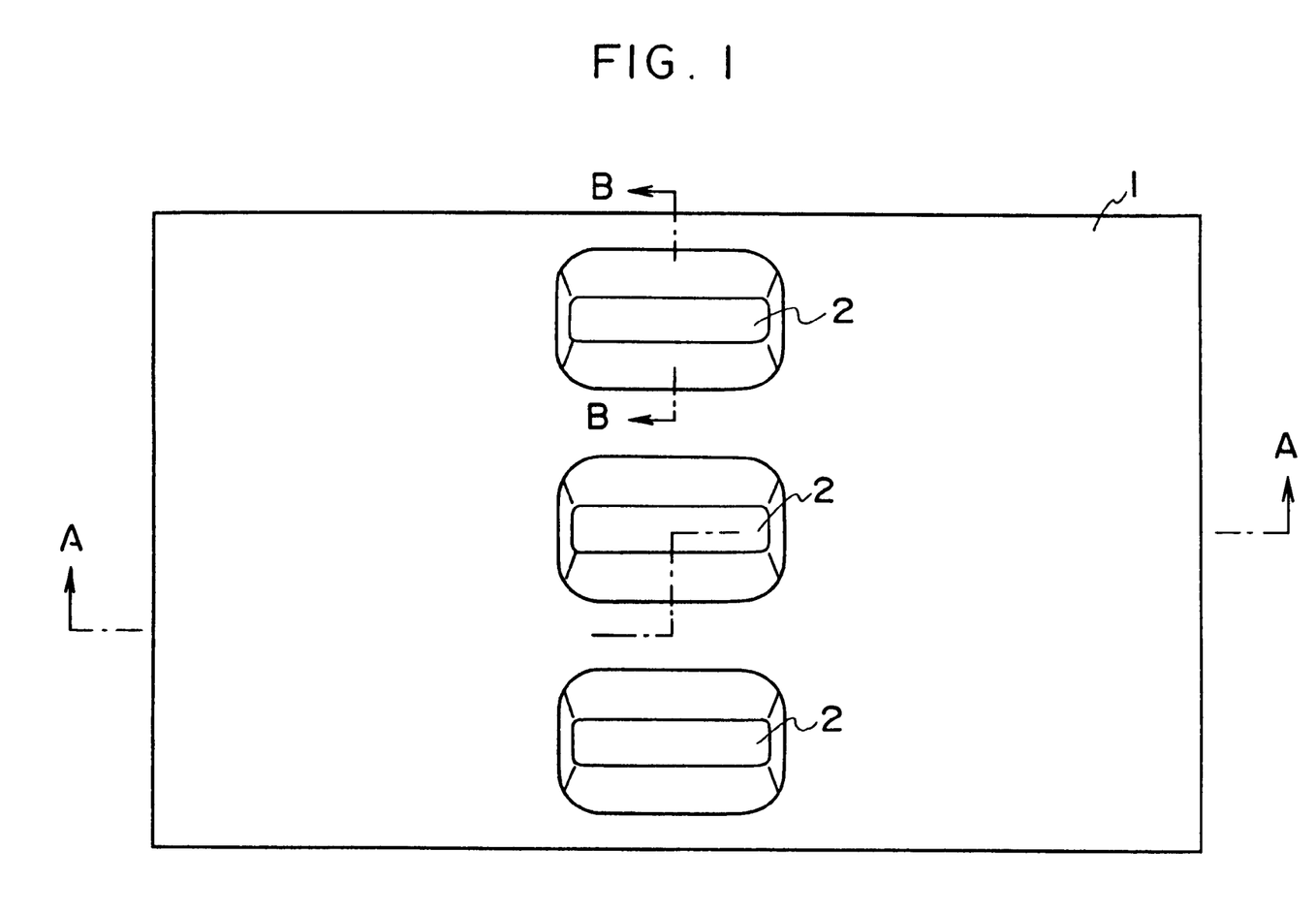
FIG. 1 is a plane view of the inner surface side of a rubber crawler according to the present invention.
Figure 2A:
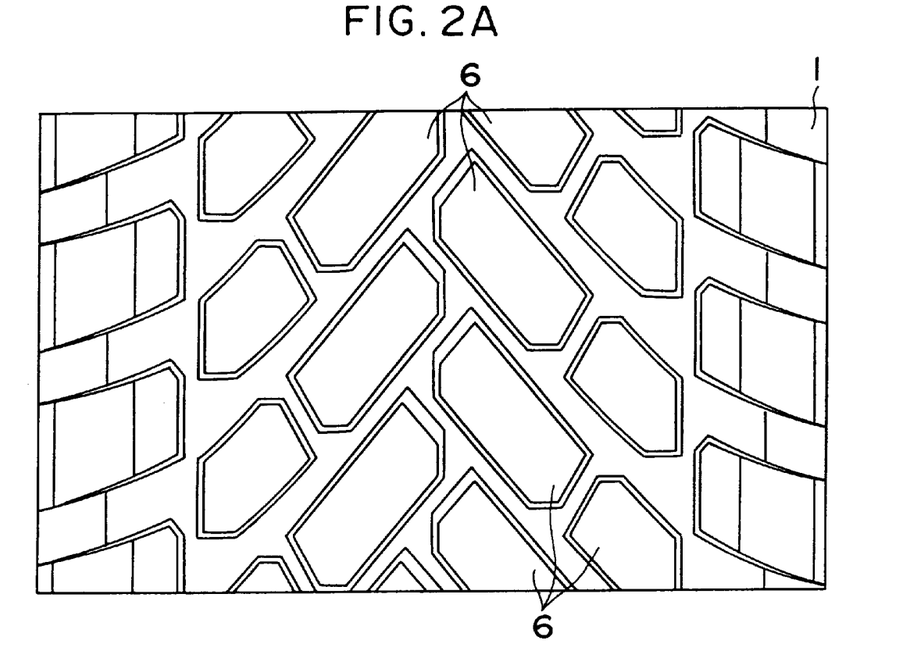
FIG. 2A is a plane view illustrating a structure of the outer surface side of the rubber crawler shown in FIG. 1.
Figure 2B:
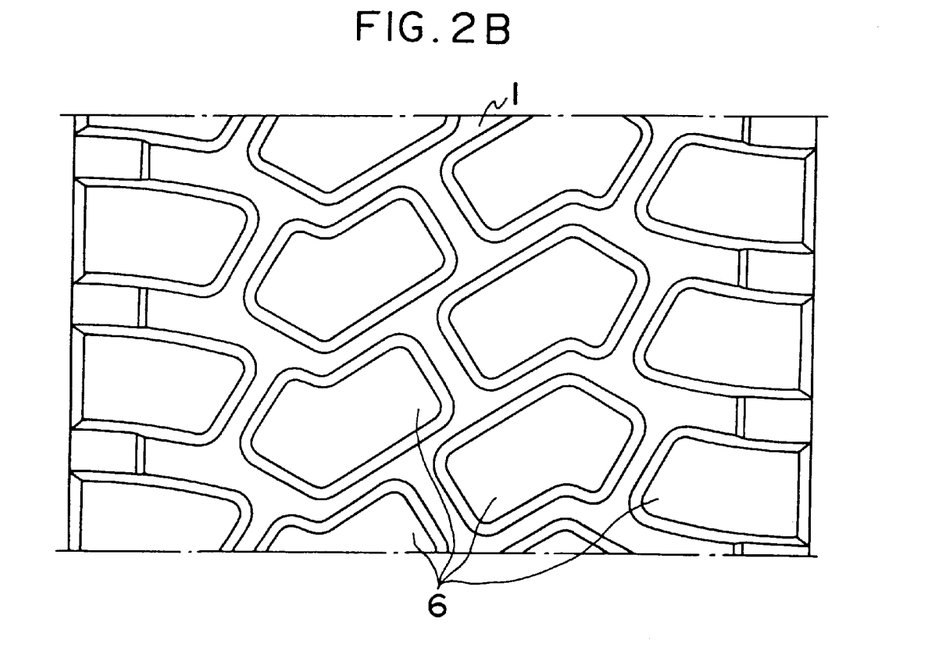
FIG. 2B is a plane view illustrating another structure of the outer surface side of the rubber crawler shown in FIG. 1.
Figure 3:
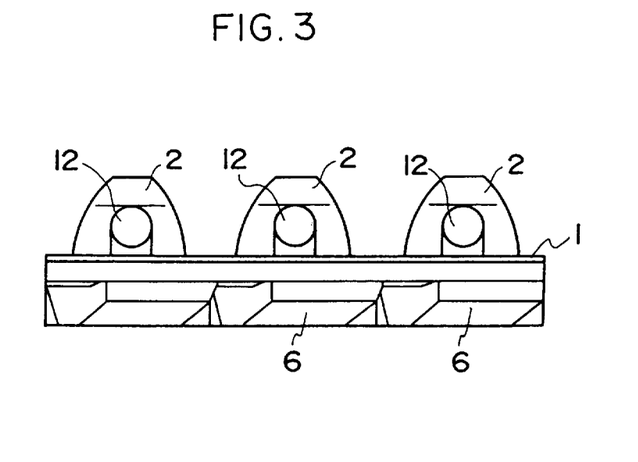
FIG. 3 is a side view of the rubber crawler shown in FIG. 1.
Figure 4:
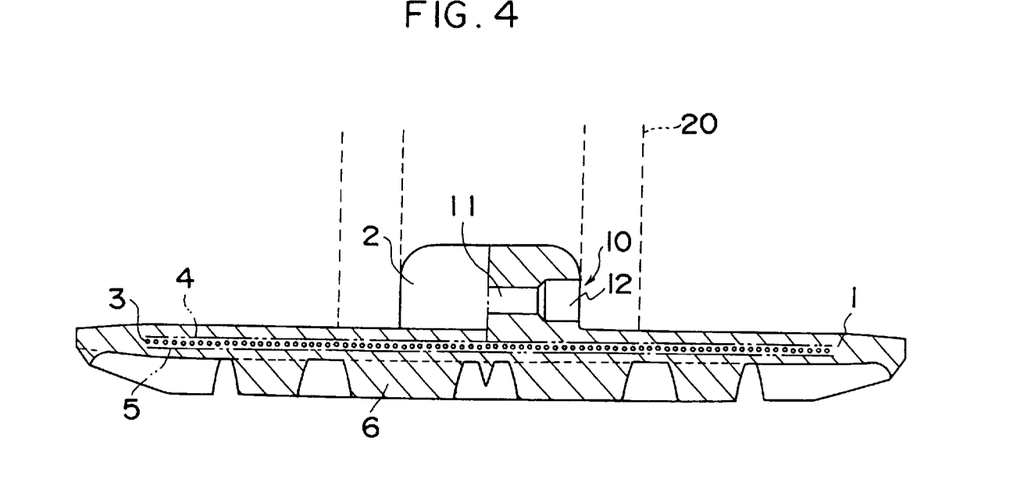
FIG. 4 is a cross section along an A—A line in FIG. 1.
Figure 5:
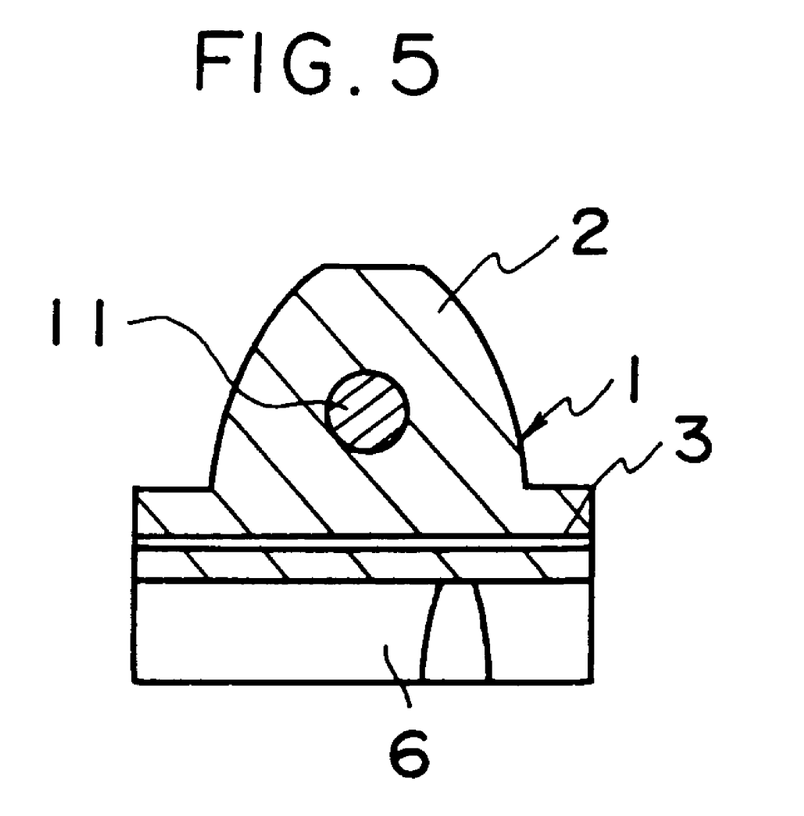
FIG. 5 is a cross section along a B—B line in FIG. 1.

FIG. 1 is a plane view of the inner surface side of the rubber crawler of the first embodiment, FIGS. 2A and 2B are plane views of the outer surface side thereof, which show different types of lags. FIG. 3 is a side view thereof. FIGS. 4 and 5 are cross sections thereof along an A—A line and a B—B line, respectively.

In these figures, the reference number 1 represents an endless belt-like rubber elastomer constituting a rubber crawler, which spreads in the upper and lower directions in FIG. 1. The reference number 2 represents rubber projections formed at regular pitches along the center on the inner face of the rubber elastomer 1. The reference number 3 represents a main cord embedded in the rubber elastomer 1 along its longitudinal direction, and the reference numbers 4 and 5 represent bias cords embedded above and below the main cord 3. The reference number 6 represents short lags formed on the outer surface of the rubber elastomer 1.

FIG. 4 illustrates the rubber crawler engaged with a wheel 20.

An abrasion-resistant member 10 is inserted into the rubber projection 2 in the width direction of the rubber crawler. In the present embodiment, the abrasion-resistant member 10 has a central portion 11 in a form of a rod having a small diameter (10 mm) and right and left end portions 12 and 13 in forms of columns having a large diameter of 15 mm and a thickness of 10 mm. The total length of the member 10 is 60 mm.

Figure 8:
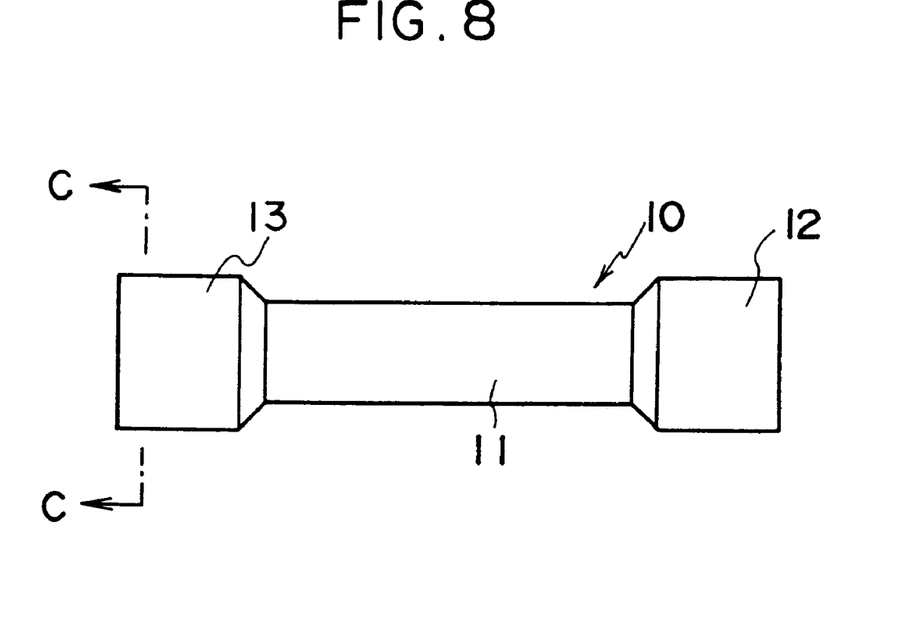
FIG. 8 is a side view of an abrasion-resistant member in the invention.
Figure 9:
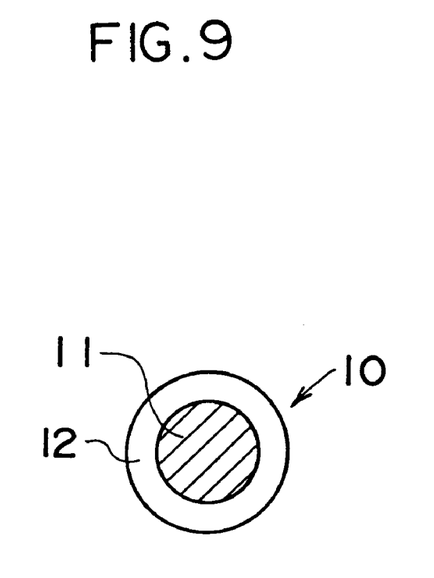
FIG. 9 is a cross section along an C—C line in FIG. 8.

FIG. 8 is a side view of the abrasion-resistant member 10. FIG. 9 is a cross section along a C—C line in FIG. 8.

The rubber projections 2 have a length along the rubber crawler width direction of 60 mm, and the abrasion-resistant members 10 are embedded in the rubber projections 2, respectively, so that the outer surfaces of the column-form end portions 12 and 13 of the member 10 are exposed. The rubber projections 2 have a height of 30 mm.

Figure 6:
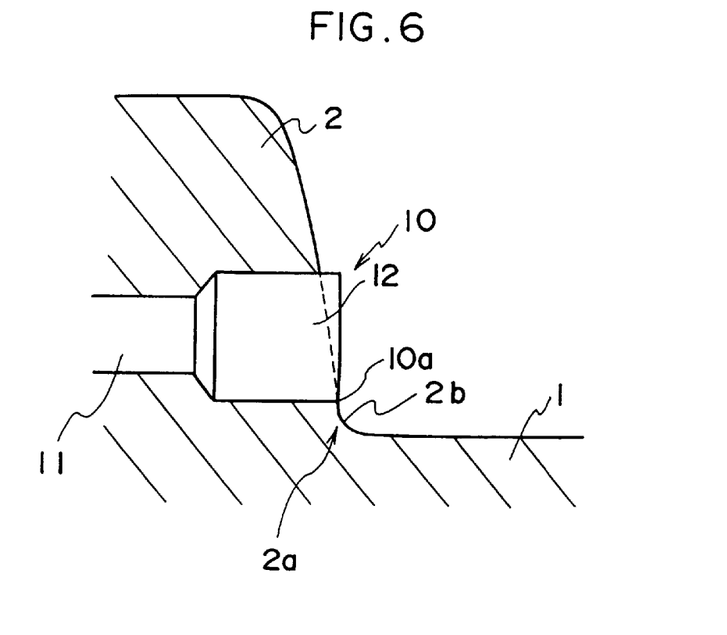
FIG. 6 is an enlarged view of the main portion of the rubber crawler according to the invention.

FIG. 6 is an enlarged cross section of the main portion in the rubber crawler of the present embodiment. The most interior portion 10a in the exposed portion, which is exposed at the side surface of the rubber projection 2, of the abrasion-resistant member 10 is positioned above the base portion 2a of the rubber projection 2. In this embodiment, a structure is shown in which a sideways surface 2b having a radius of curvature of 2 mm is positioned between the most interior portion 10a (in the radial direction) in the exposed portion and the base portion 2a of the rubber projection 2 and continues to the inner surface of the rubber crawler 1. As a result, the curved surface 2b absorbs shearing stress and twisting force generated in the abrasion-resistance member 10, so that generation of cracks in the base portion 2a of the rubber projection 2 will decrease.

As understood from FIG. 3, the abrasion-resistance member 10 is made in such a manner that its right and left end portions 12 and 13 have a shape different from the shape of its central portion 11. In the embodiment shown in FIG. 3, the central portion 11 is in a rod form, and each of the right and left end portions is in a form of a column having a larger diameter than that of the rod of the central portion 11. For this reason, even if the abrasion-resistant member 10 is pressed, it is not pushed out from the rubber projection 2. Consequently, endurance of the rubber crawler is improved.

In the first embodiment, the abrasion-resistant member 10 is made in such manner that its central portion 11 is in a form of a rod having a small diameter and each of its right and left end portions is in a form of a column having a large diameter, however, the shape of the member 10 is not limited to this shape. If the diameter of the central portion 11 is different from diameters of the right and left end portions, sections of the small and large diameter portions may be circular, elliptical or rectangular shapes. Other shapes may be also adopted.

The abrasion-resistant member 10 used in the present embodiment may be made of a metal, but preferably it is made of a synthetic resin which can be made light. The resin includes, for example, a super high molecular weight polyethylene, or 6—6-nylon.

Figure 13:
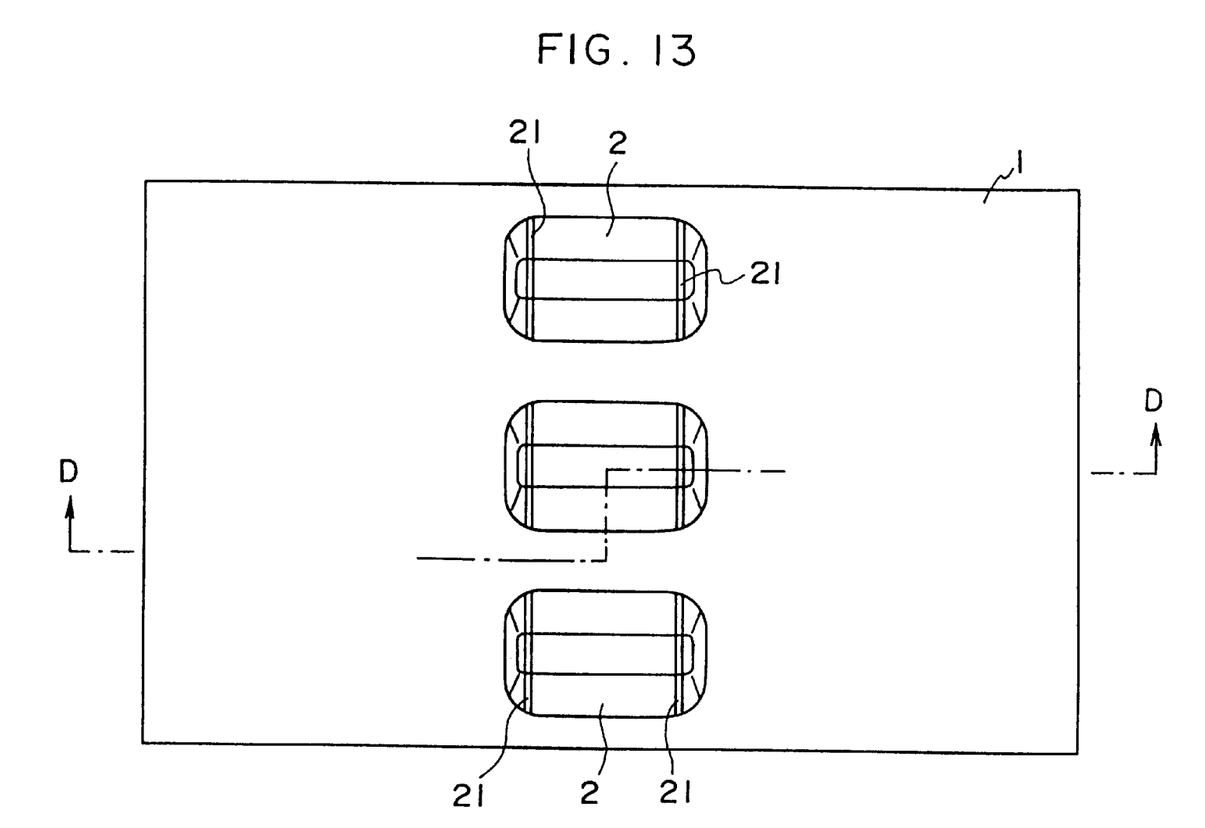
FIG. 13 is a plan view, similar to FIG. 1, of a modified example of the rubber crawler of FIG. 1.

As a modified example of the present embodiment, at least one groove 21 may be formed in the side surface of the rubber projection 2 as shown in FIG. 13. The dimension of the groove 21 must be set such that it dose not disturb the rigidity and running performance of the rubber projection 2.

Figure 14:
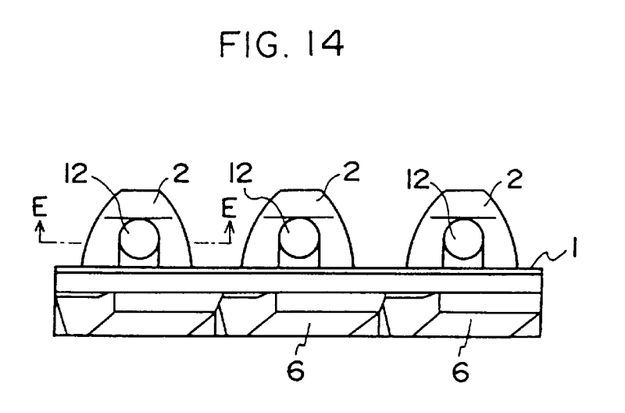
FIG. 14 is a side view of the rubber crawler shown in FIG. 13.
Figure 15:
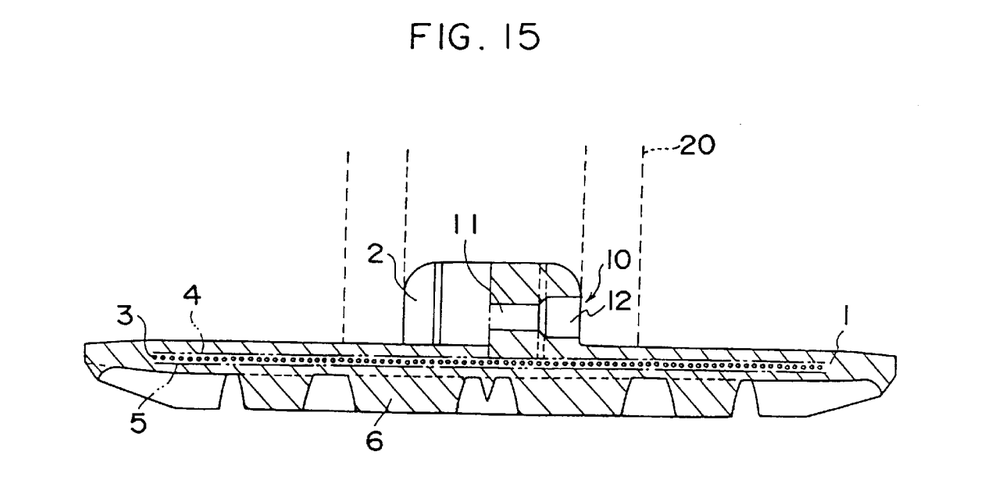
FIG. 15 is a cross-section taken along line D—D in FIG. 13.
Figure 16:
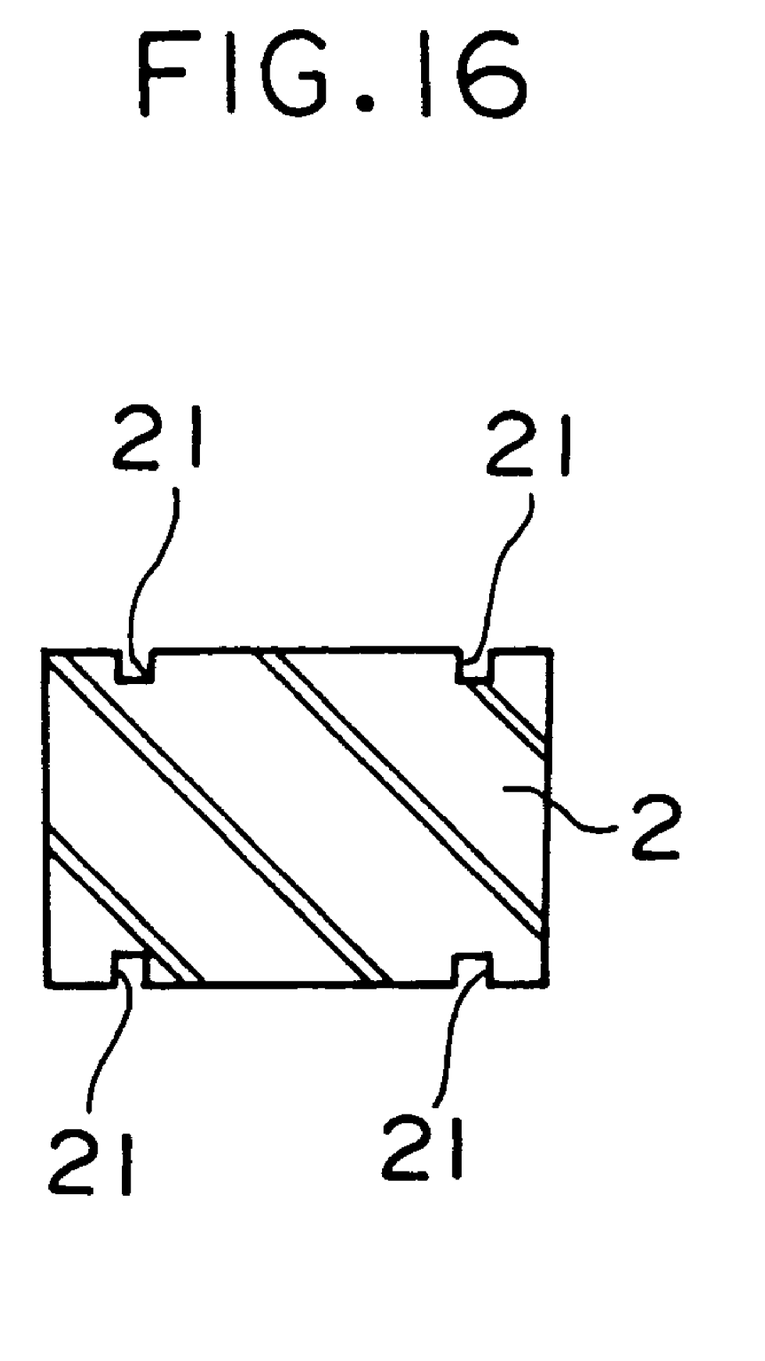
FIG. 16 is a cross-section taken along line E—E in FIG. 14.

FIG. 14 is a side view of this modified rubber crawler. FIG. 15 is a cross-section taken along line D—D in FIG. 13. FIG. 16 is cross-section taken along line E—E in FIG. 14.

In this modified example, if abrasion is caused at the side surface of the rubber projection 2, the degree of the abrasion can be easily known by measuring the distance between the groove 21 and the side surface the rubber projection 2.

It should be noted that the groove 21 may be formed as a plurality of small concave portions (not shown) which are aligned in a row. In this case, it is not necessary to provide plural small concave portions, and even a single concave portion may be sufficient for the purpose.

In addition, although the groove 21 is formed along the up-and-down direction of FIG. 13 in this illustrated example, the groove 21 may be formed along the left-and-right direction of FIG. 13 in the side and/or the top surface of the rubber projection 2. In short, the shape and location of the groove 21 may be modified as desired as long as the groove 21 can be used to measure the degree of abrasion of the side surface of the rubber projection 2.

In the present embodiment the end portions 12 and 13 of the embedded abrasion-resistant member 10 are larger in their sectional areas than the central portion 11, as described above, and consequently abrasion of the rubber projection is reduced when it contacts the wheel. Furthermore, the sectional shape of the central portion 11 is different from sectional shapes of the right and left end portions 12 and 13, and consequently the abrasion-resistant member 10 is hardly pushed out from the rubber projection 2. Thus, abrasion and breakage of the rubber projection 2 will be certainly reduced and the severe abrasion of the rubber projection 2 can be prevented for a long time.

The process for embedding the abrasion-resistant member into the rubber projection includes, for example, the steps of pre-pressing non-vulcanized rubber into a rubber projection-corresponding portion beforehand, setting it into a rubber projection-forming cavity of a rubber crawler-forming mold, embedding an abrasion-resistant member thereinto, charging a non-vulcanized rubber for a rubber crawler base into the mold, and then vulcanizing the whole.

Of course, it is allowable to set the abrasion-resistant member 10 into a rubber projection-forming cavity of a rubber crawler-forming mold, charge a non-vulcanized rubber thereinto, and then vulcanize/form it.

Figure 7:
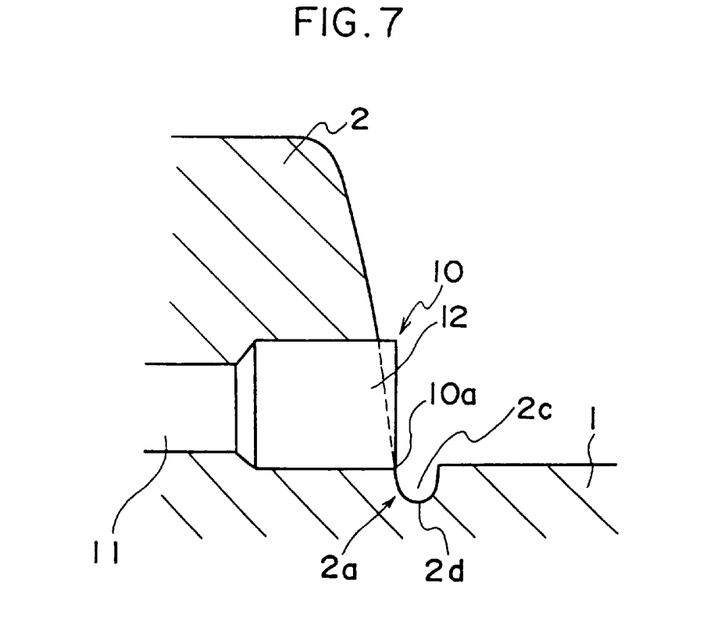
FIG. 7 is an enlarged view of another embodiment, which is similar to FIG. 6.

FIG. 7 is a view illustrating the second embodiment according to the invention, which is similar to FIG. 6. In the present embodiment, as the base portion 2a of the rubber projection 2, a groove 2c is formed so as to substantially have the curved surface 2b. The exposure position of the abrasion-resistant member 10 is above a groove bottom 2d of the groove 2c. In the present embodiment, other structures than the above are the same in the first embodiment, the explanation of which is omitted.

In the present embodiment, at least one groove such as the groove 21 of the first embodiment shown in FIGS. 13–16 may be formed on the side surface of the rubber projection 2.

In the present embodiment, because of the groove 2c the most interior portion 10a, in the radial direction, in the exposed portion of the abrasion-resistant member 10 is positioned above the base portion (i.e., the groove bottom 2d in this embodiment) of the rubber projection. In the same manner as in the first embodiment, therefore, the shearing stress and twisting force generated in the abrasion-resistant member 10 are absorbed so that the generation of cracks in the base portion 2a of the rubber projection 2 will be reduced. Namely, the same effects as by the first embodiment can be obtained.

Figure 10:
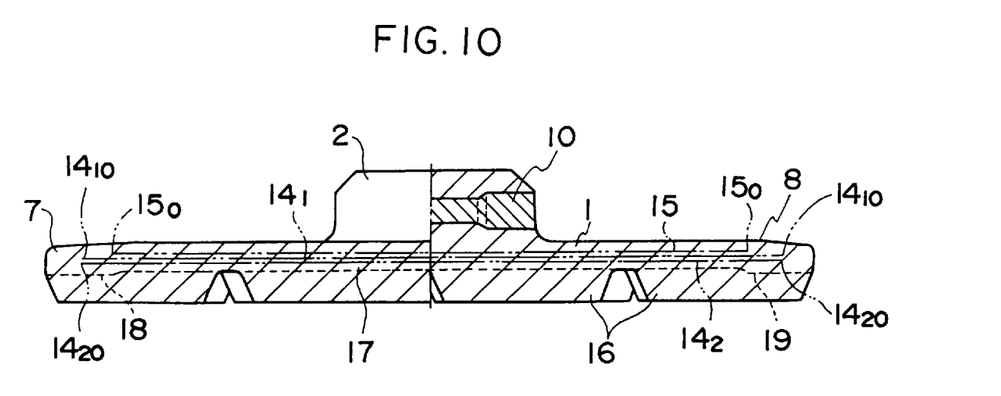
FIG. 10 is a cross section of yet another embodiment according to invention along an A—A line.
Figure 11:
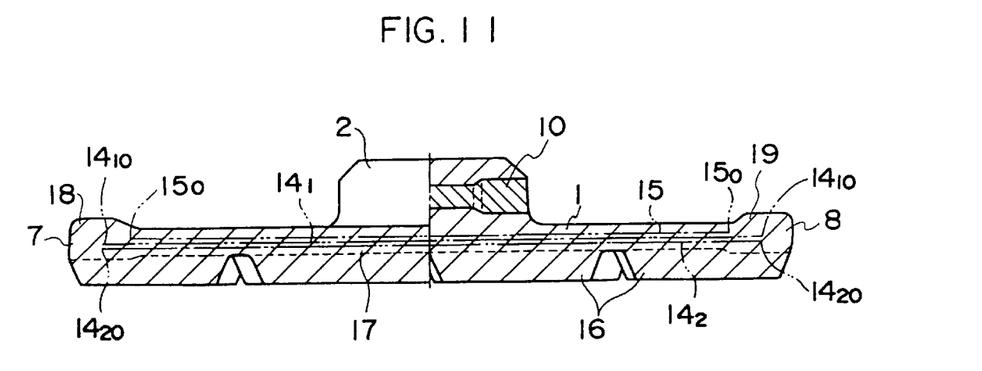
FIG. 11 is a cross section of a modified example of the rubber crawler, which is similar to FIG. 10.
Figure 12:
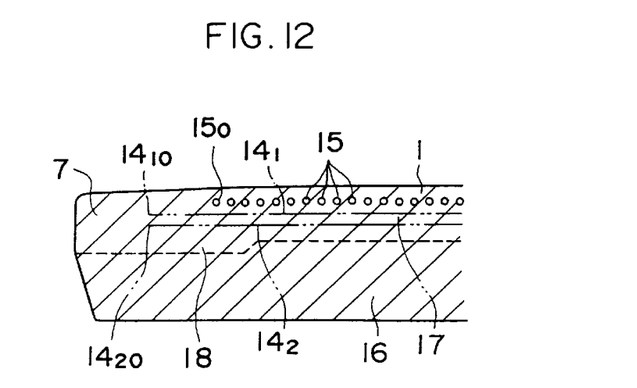
FIG. 12 is an enlarged view of the main portion in FIG. 10.

The following will describe the third embodiment according to the invention, referring to FIGS. 10–12.

FIGS. 10 and 11 are cross sections obtained by cutting the rubber crawler of the present embodiment along an A—A line, which are similar to FIG. 4. FIG. 12 is an enlarged view of the main portion in FIG. 10. As understood from these cross sections, a reinforcing layer 15 is embedded in a rubber elastomer 1 along its longitudinal direction. The reinforcing layer 15 is preferably a steel cord layer which can resist the tensile power applied to the rubber crawler. In the present embodiment, bias cord layers $14_1$ and $14_2$ whose inclination angles are opposite to each other are also embedded outside the steel cord layer 15, respectively, as reinforcing layers. Of course, the bias cord layers $14_1$ and $14_2$ may be embedded inside the steel cord layer 15.

In the present embodiment, it is preferred that the rubber crawler is an inner surface-driving type. Its width is, for example, 300 mm. The steel cord layer 15 is embedded along the width direction center to have a width of, for example, 250 mm, and the bias cord layers $14_1$ and $14_2$ are embedded along the width direction center to have a width of, for example, 280 mm. In the present embodiment, therefore, the portions where any reinforcing cord layers (14 and 15) are never present, that is, no-cord embedded portions 7,8 are areas within 10 mm from the width direction ends.

In the present embodiment, thicker portions 18 and 19 having a thickness larger by 1.6 mm than a body portion 17 are formed between lags 16 on the outer surface side of the aforementioned no-cord embedded portions 7,8. The width of each of the thicker portions, which include an obliquely-rising portion, is 30 mm. In short, the thicker portions 18 and 19 are formed in such a manner that they will be thicker than the body portion 17 and all of the width ends $15_0$, $14_{10}$ and $14_{20}$ of the reinforcing cord layers 15, $14_1$ and $14_2$ can be covered with these thicker portions 18 and 19.

In the case of embedding plural reinforcing cord layers in the rubber elastomer, it is sufficient that the layer nearest to the width (direction) ends is covered with the thicker layers 18 and 19.

The thicker portions formed at the no-cord embedded portions of the rubber crawler may be arranged at any one of inner surface and outer surface sides of the rubber crawler, or, as the case may be, at both the sides. FIG. 10 illustrates a structure wherein the thicker portions 18 and 19 are arranged at the outer surface side of the rubber crawler. On the contrary, FIG. 11 illustrates a structure wherein the thicker portions 18 and 19 are arranged at the inner and outer surface sides of the rubber crawler.

The thickness of the thicker portions are varied dependently on the dimensions or an intended running situation of the rubber crawler, and the like, but when the thickness is larger, by 10 mm or less and preferably by 1–5 mm, than the thickness of the body portion of the rubber crawler, remarkable effects can be obtained.

In the present invention, other structures than the above are the same in the first embodiment, the explanation of which is omitted. In the present embodiment, it is preferred that the abrasion-resistant member 10 is made into such a shape that the diameter of its central portion is different from that of its end portions (see FIGS. 10 and 11); however, other shapes may be used. As the case may be, the abrasion-resistant member need not be used.

Further, in the present embodiment, at least one groove such as the groove 21 of the first embodiment shown in FIGS. 13–16 may be formed on the side surface of the rubber projection 2.

According to the aforementioned structure of the present invention, the rigidity of the no-cord embedded portion, in particular the boundary of this portion and the reinforcing cord layer can be improved without any striking form/shape being induced. Thus, even when the rubber crawler is driven at a high speed, the bend phenomenon of its no-cord embedded portion can be prevented to remarkably reduce breakage of the no-cord embedded portion.

What is claimed is:

1. A rubber crawler wherein rubber lugs are formed on the outer surface of an endless belt-like elastomer, rubber projections for transmission of driving force or prevention of the crawler from coming off from a wheel are formed on the inner surface of the elastomer at regular pitches, and abrasion-resistant members are embedded in the respective rubber projections along the width direction of the crawler; and wherein each of the abrasion-resistant members comprises a central portion having first diameter and a pair of end portions having a second diameter which are connected to both ends of the central portion, and the first diameter of the central portion and the second diameter of the end portions are different from each other.

2. The rubber crawler according to claim 1, wherein both end portions of each of the abrasion-resistant members are exposed at sides of each of the rubber projections, respectively.

3. The rubber crawler according to claim 1, wherein the central portion of each of the abrasion-resistant members has a shape having a small diameter, and each of the end portions thereof has a shape having a larger diameter than that of the central portion.

4. The rubber crawler according to claim 1, wherein the abrasion-resistant members are made of a light synthetic resin.

5. The rubber crawler according to claim 1, wherein each of the end portions of the abrasion-resistant members has an exposed portion which is exposed at the side surface of each of the rubber projections, and the most interior portion in the radial direction of the exposed portion is positioned above a base portion of each of the rubber projections.

6. The rubber crawler according to claim 5, wherein a sideways curved surface is positioned between the most interior portion in the radial direction of the exposed portion and the base portion of each of the rubber projections, and continues to the inner surface of the rubber crawler.

7. The rubber crawler according to claim 1, wherein a reinforcing cord layer is embedded in the endless belt-like elastomer along a longitudinal direction of the endless belt-like elastomer, and at each of width direction-end portions of the endless belt-like elastomer a thicker portion is formed so as to extend from the end of the width direction-end portions over width direction-end of the reinforcing cord layer.

8. The rubber crawler according to claim 7, wherein the reinforcing cord layer is a steel cord layer embedded in the endless belt-like elastomer along the longitudinal direction of the endless belt-like elastomer.

9. The rubber crawler according to claim 7, wherein the reinforcing cord layer is a bias cord layer embedded in the endless belt-like elastomer along the longitudinal direction of the endless belt-like elastomer.

10. The rubber crawler according to claim 7, wherein the thicker portion is formed at at least one of the inner surface side and the outer surface side of the rubber crawler.

11. A rubber crawler wherein a reinforcing cord layer is embedded in an endless belt-like rubber elastomer along a longitudinal direction of the endless belt-like rubber elastomer, and rubber lugs are formed on the outer surface of the elastomer, and at each of width direction-end portions of the endless belt-like elastomer a thicker portion is formed so as to extend from the end of the width direction-end portion end over width direction-end of the reinforcing cord layer.

12. The rubber crawler according to claim 11, wherein the reinforcing cord layer is a steel cord layer embedded in the endless belt-like elastomer along the longitudinal direction of the endless belt-like elastomer.

13. The rubber crawler according to claim 11, wherein the reinforcing cord layer is a bias cord layer embedded in the endless belt-like elastomer along the longitudinal direction of the endless belt-like elastomer.

14. The rubber crawler according to claim 11, wherein the thicker portion is formed at at least one of the inner surface side and the outer surface side.

* * * * *